United States Patent

Sasaki

[11] Patent Number: 5,854,811
[45] Date of Patent: Dec. 29, 1998

[54] CIRCUIT AND METHOD FOR COMPENSATING FOR NONLINEAR DISTORTION OF INPUT SIGNAL

[75] Inventor: Chiharu Sasaki, Tokyo, Japan

[73] Assignee: NEC Corporation, Tokyo, Japan

[21] Appl. No.: 552,377

[22] Filed: Nov. 3, 1995

[30] Foreign Application Priority Data

Nov. 7, 1994 [JP] Japan ................................. 6-296022

[51] Int. Cl.$^6$ .................................................... H04K 1/02
[52] U.S. Cl. ............................ 375/296; 375/297; 455/63; 332/126
[58] Field of Search ..................... 375/296, 297, 375/278, 284, 285, 346, 350; 455/63, 114, 295, 296; 330/149; 332/123, 126

[56] References Cited

U.S. PATENT DOCUMENTS

| | | | |
|---|---|---|---|
| 4,811,422 | 3/1989 | Kahn | 455/114 |
| 5,136,267 | 8/1992 | Cabot | 333/174 |
| 5,252,930 | 10/1993 | Blauvelt | 330/149 |
| 5,600,676 | 2/1997 | Ramesh | 375/283 |

FOREIGN PATENT DOCUMENTS 1200807 8/1989 Japan .

*Primary Examiner*—Don N. Vo
*Attorney, Agent, or Firm*—Whitham, Curtis & Whitham

[57] ABSTRACT

A distortion compensating circuit comprises a frequency control section, a filtering section and an eliminating section. Major frequencies are detected from an input signal including major signals having the major frequencies by a major frequency detector performing spectrum analysis of the input signal. Receiving the major frequencies, the frequency control section calculates distortion frequencies from the major frequencies based on predetermined formulae representing the nonlinear distortion. The predetermined formulae are stored in advance. The frequency control section generates frequency control signals indicating the distortion frequencies. After the input signal is divided into a first signal and a second signal, the filtering section extracts frequency components having the distortion frequencies from the first signal in response to the frequency control signals. The frequency components are eliminated from the second signal by combining the phase-reversed frequency component with the second signal by the eliminating section.

24 Claims, 6 Drawing Sheets

CIRCUIT AND METHOD FOR COMPENSATING FOR NONLINEAR DISTORTION OF INPUT SIGNAL

BACKGROUND OF THE INVENTION

1. Field of the invention

The present invention generally relates to distortion compensation in a signal transmission system such as a microwave transmission system, and in particular to a distortion compensating circuit and method which eliminates nonlinear distortions from an input signal.

2. Description of the Related Art

In the field of a signal transmission system, several distortion compensating circuits have been proposed and developed which are designed to cancel out the nonlinear distortions caused by the nonlinearity of the transmission system. As an example of such a circuit, a nonlinear distortion compensating circuit is disclosed in Japanese Patent Unexamined Publication No. 1-200807, which employs a feedforward scheme as shown in FIG. 1.

Referring to FIG. 1, the feedforward circuit is comprised of a distortion detecting loop 20 and a distortion eliminating loop 21. In the distortion detecting loop 20, an input signal line is branched into two signal paths by a branching circuit 10, one signal path comprising a main amplifier (power amplifier) 11 and the other signal path comprising a variable attenuator 12 and a variable delay line 14. The respective outputs of the main amplifier 11 and the variable delay line 14 are combined and then distributed to two signal paths of the distortion eliminating loop 21 by a hybrid circuit 16. In the distortion eliminating loop 21, one signal path is comprised of a variable attenuator 13, a variable delay line 15 and secondary amplifier 18 and the other signal path is a transmission path. The output signal of the secondary amplifier 18 and the signal passing through the transmission path 19 are combined by a hybrid circuit 17.

The distortion detecting loop 20 detects intermodulation distortion originating in the main amplifier 11 and outputs the distortion component to the variable attenuator 13 of the distortion eliminating loop 21 through the hybrid circuit 16. The variable attenuator 12 and the variable delay line 14 are adjusted to cause the hybrid circuit 16 to generate the intermodulation distortion originating in the main amplifier 11, that is, a difference between the outputs of the main amplifier 11 and the branching circuit 10. The output of the main amplifier 11 is transferred to the transmission path 19 of the distortion eliminating loop 21.

In the distortion eliminating loop 21, the variable attenuator 13, the variable delay line 15 and secondary amplifier 18 are adjusted to reverse the phase of the distortion component received from the distortion detecting loop 20. Therefore, the hybrid circuit 17 outputs the amplified transmission signal which has no distortion component originating in the main amplifier 11.

However, the above-mentioned circuit is not designed to cancel out distortion components included in the input signal itself but the intermodulation distortion originating in the main amplifier 11. In other words, it is assumed that the input signal includes no distortion. Therefore, in cases where the input signal itself undergoes nonlinear distortion caused by the nonlinearity of transmission amplifiers and other circuits, the conventional circuit arrangement cannot achieve the elimination of such nonlinear distortion components.

SUMMARY OF THE INVENTION

An object of the present invention is to provide a distortion compensating circuit which eliminates nonlinear distortion components from an input signal.

Another object of the present invention is to provide a distortion compensating circuit and a method which compensate for intermodulation distortion of a multiwave input signal comprising a plurality of frequency bands.

Still another object of the present invention is to provide a distortion compensating circuit and a method which compensate for harmonic distortion of an input signal.

A distortion compensating circuit according to the present invention compensates for nonlinear distortion of an input signal including a major signal having a major frequency. A major frequency detector performs a spectrum analysis of an input signal to detect the major frequency. Receiving the major frequency, a calculator calculates a distortion frequency from the major frequency based on a predetermined formula representing the nonlinear distortion. The predetermined formula is stored in advance. A calculation controller generates a frequency control signal indicating the distortion frequency. After the input signal is divided into a first signal and a second signal, a filter circuit extracts a frequency component having the distortion frequency from the first signal in response to the frequency control signal. The frequency component is adjusted to perform elimination, by a phase controller and an amplifier, and then a combiner combines the adjusted frequency component with the second signal to eliminate the frequency component from the second signal.

Preferably, the calculation controller comprises a memory for storing a plurality of predetermined formulae representing intermodulation distortion and harmonic distortion. The formulae representing secondary and tertiary intermodulation distortion are sufficient to practically eliminate the intermodulation distortion from the input signal.

The filter circuit comprises a band-pass filter having a variable passband frequency which is set at the distortion frequency. In other words, the band-pass filter has the variable passband frequency determined by the frequency control signal received from the calculation controller.

DETAILED DESCRIPTION OF THE PREFERRED EMBODIMENTS

A distortion compensating circuit according to an embodiment of the present invention receives a multiwave signal comprising a plurality of frequency bands from a preceding stage such as, for example, a transmission power amplifier or a transmission line. Nonlinear distortion components originating in the preceding stage are eliminated from the input multiwave signal by the distortion compensating circuit. The nonlinear distortion includes intermodulation and/ or harmonic distortion caused by the nonlinearity of the preceding stage. Hereinafter, it is assumed that the multiwave signal includes two major signals of predetermined frequencies Fi and Fj, respectively.

Figure 1:
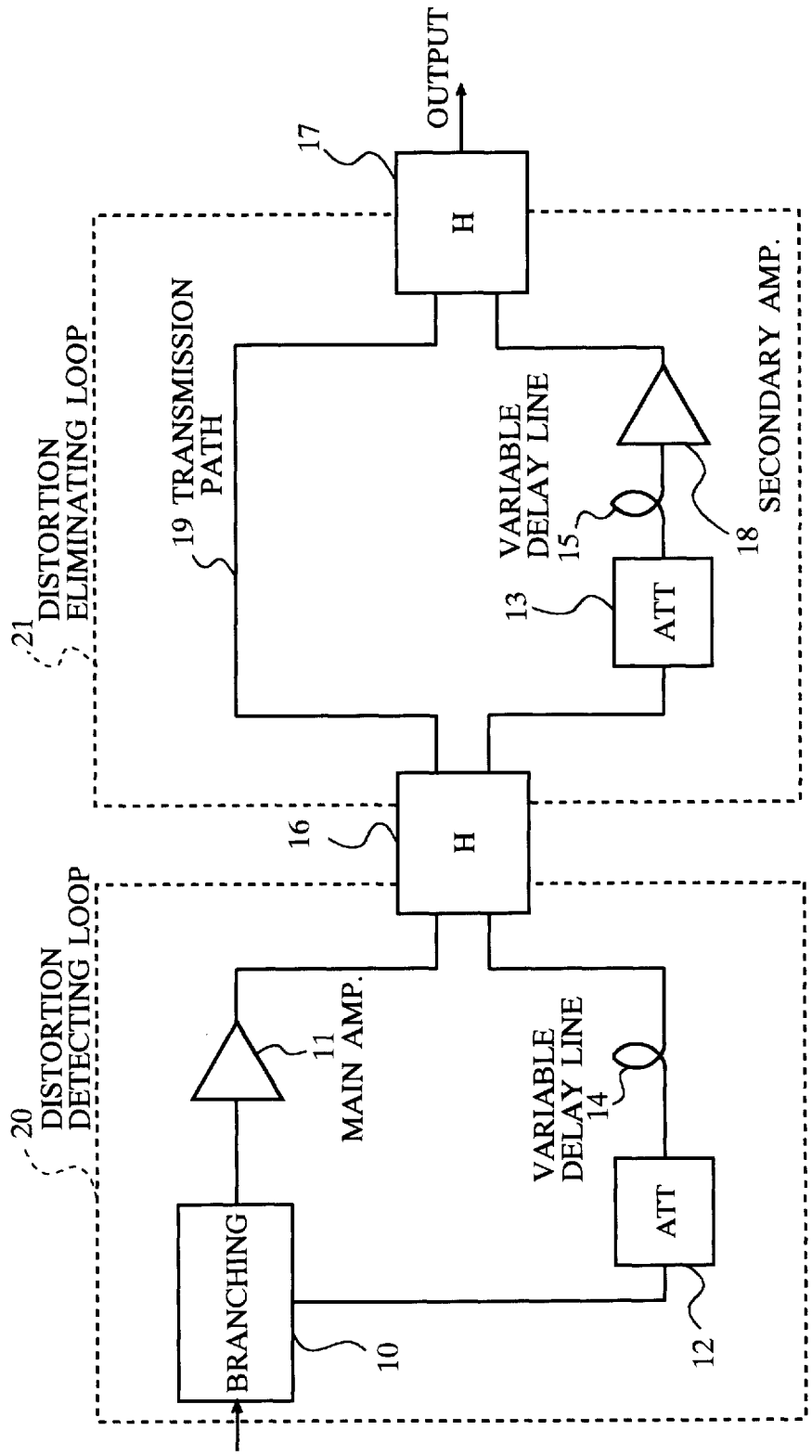
FIG. 1 is a block diagram showing the circuit configuration of a conventional distortion compensating circuit.
Figure 2:
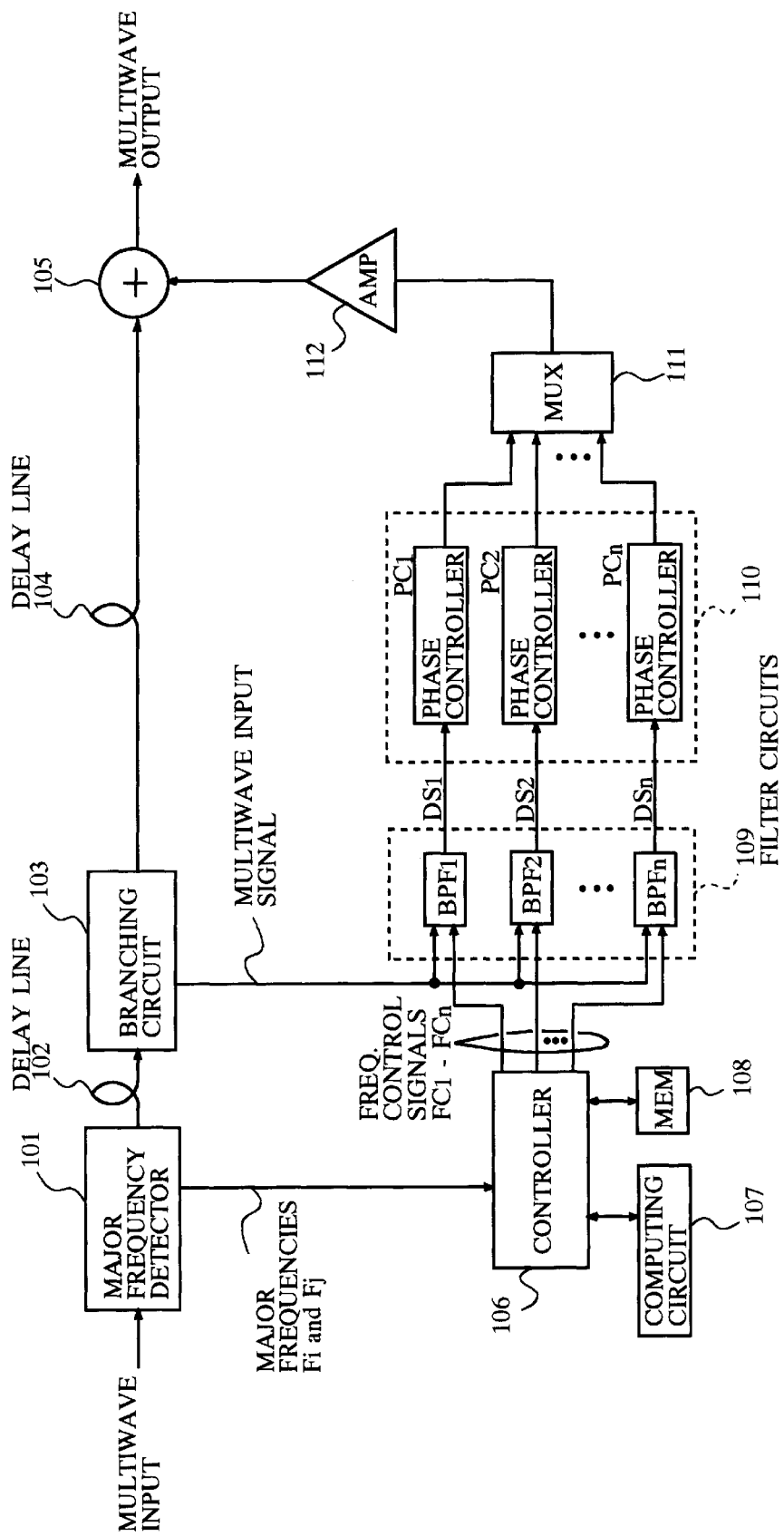
FIG. 2 is a block diagram showing the circuit configuration of an embodiment of a distortion compensating circuit according to the present invention.

Referring to FIG. 2, the distortion compensating circuit is comprised of a major signal section, a control signal section, a distortion extracting section and a distortion eliminating section. The major signal section is comprised of a major frequency detector 101, a delay line 102, a branching circuit 103, a delay line 104 and a combiner 105. The control signal section is comprised of a controller 106, a computing circuit 107 and a memory 108. The distortion extracting section is comprised of a filter circuit 109, and the distortion eliminating section is comprised of a phase adjustment circuit 110, a combiner 111, an amplifier 112 and the combiner 105.

The major frequency detector 101, receiving the multiwave signal, performs a well-known spectrum analysis of the input multiwave signal. Using the results of the spectrum analysis, the major frequency detector 101 detects the major frequencies Fi and Fj. More specifically, the major frequency detector 101 selects two frequency components having an amplitude sufficiently greater than other frequency components and then outputs the respective frequencies of the two selected frequency components as the major frequencies Fi and Fj to the controller 106. Moreover, the major frequency detector 101 passes the input multiwave signal to the branching circuit 103 through the delay line 102. The branching circuit 103 outputs the input multiwave signal to the combiner 105 through the delay line 104 and to the filter circuit 109.

The controller 106 generates frequency control signals FC1–FCn in response to the major frequencies Fi and Fj received from the major frequency detector 101. More specifically, receiving the major frequencies Fi and Fj, the controller 106 causes the computing circuit 107 to calculate distortion frequency bands at which nonlinear distortion components probably exist. The calculation is performed using a formula predetermined by the kind of the nonlinear distortion, that is, intermodulation distortion or harmonic distortion. The necessary formulae are stored in the memory 108. In this case, the following formulae are used to calculate the distortion frequency bands: ±Fi ±Fj and ±2Fi±Fj for intermodulation distortion, and 2Fi, 2Fj, 3Fi and 3Fj for harmonic distortion. The number of the frequency control signals FC1–FCn is determined depending on the extent of which power of the nonlinear distortion is taken into account.

The respective frequency control signals FC1–FCn indicating the distortion frequency bands are output to the filter circuit 109. The filter circuit 109 consists of n band-pass filters BPF1–BPFn which are capable of varying in passband according to the respective frequency control signals FC1–FCn received from the controller 106. In other words, the filter circuit 109 is controlled by the frequency control signals FC1–FCn of the controller 106 such that the band-pass filters BPF1–BPFn form the passbands corresponding to the distortion frequency bands calculated by the computing circuit 107. Since the band-pass filters BPF1–BPFn receives the multiwave input signal from the branching circuit 103, the respective frequency components DS1–DSn corresponding to the distortion frequency bands are extracted from the multiwave input signal.

The phase adjustment circuit 110 consists of n phase controllers PC1–PCn connected to the band-pass filters BPF1–BPFn, respectively. The respective phase controllers PC1–PCn reverse the phases of the frequency components DS1–DSn so as to cancel out the corresponding distortion components included in the multiwave input signal. The phase-reversed frequency components are combined by the combiner 111 and then amplified by the amplifier 112 so as to equal in amplitude the corresponding distortion components included in the multiwave input signal.

Therefore, the distortion components are eliminated from the multiwave input signal by the combiner 105 combining the phase-reversed frequency components with the multiwave input signal. It is apparent that the delay line 102 is set at a time period equal to the delay time generated in the controller 106 and the delay line 104 is set at a time period equal to the total delay time generated in the filter circuit 109, the phase adjustment circuit 110, the combiner 111 and the amplifier 112.

INTERMODULATION DISTORTION ELIMINATION

Figure 3:
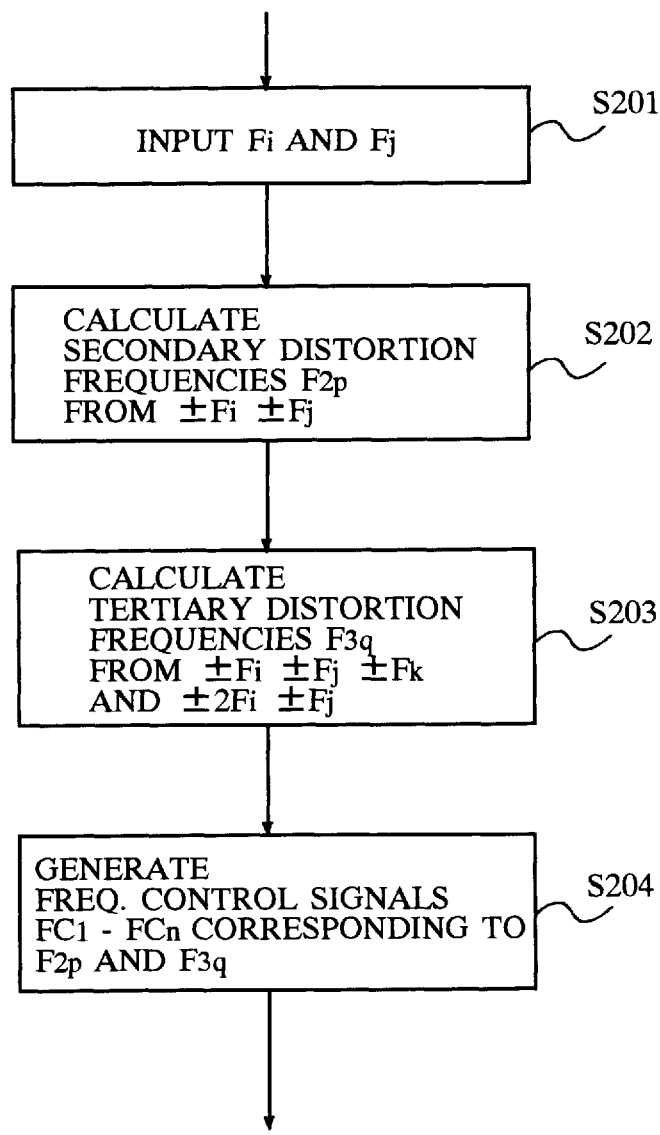
FIG. 3 is a flowchart showing an embodiment of a distortion compensating method according to the present invention.

FIG. 3 shows an operation of generating frequency control signals for the intermodulation distortion elimination performed in the controller 106. When receiving the major frequencies Fi and Fj (S201), the controller 106 reads the formulae, ±Fi±Fj, for secondary intermodulation distortion and ±2Fi±Fj for tertiary intermodulation distortion from the memory 108. Since the intermodulation distortion occurs at frequencies of positive results of ±Fi±Fj or ±2Fi±Fj, the computing circuit 107 readily calculates the distortion frequencies. More specifically, the secondary distortion frequencies F2p are calculated from ±Fi±Fj (S202), and the tertiary distortion frequencies F3p from ±2Fi±Fj (S203). In cases where the major frequencies Fi, Fj and Fk are detected by the major frequency detector 101, the formula, ±Fi±Fj±Fk,is read out and used to calculate the tertiary distortion frequencies F3p.

Receiving the distortion frequencies F2p and F3p from the computing circuit 107, the controller 106 generates the frequency control signals FC1–FCn indicating the respective distortion frequency bands (S204). The respective frequency control signals FC1–Fcn are output to the band-pass filters BPF1–BPFn which are set at the passband frequencies corresponding to the frequency control signals FC1–Fcn. This causes the filter circuit 109 to pass only the distortion frequency components DS1–Dsn of the input multiwave signal to the phase adjustment circuit 110. In this manner, the intermodulation distortion is eliminated from the multiwave input signal by the combiner 105 combining the phase-reversed distortion frequency components with the multiwave input signal.

Figure 5A:
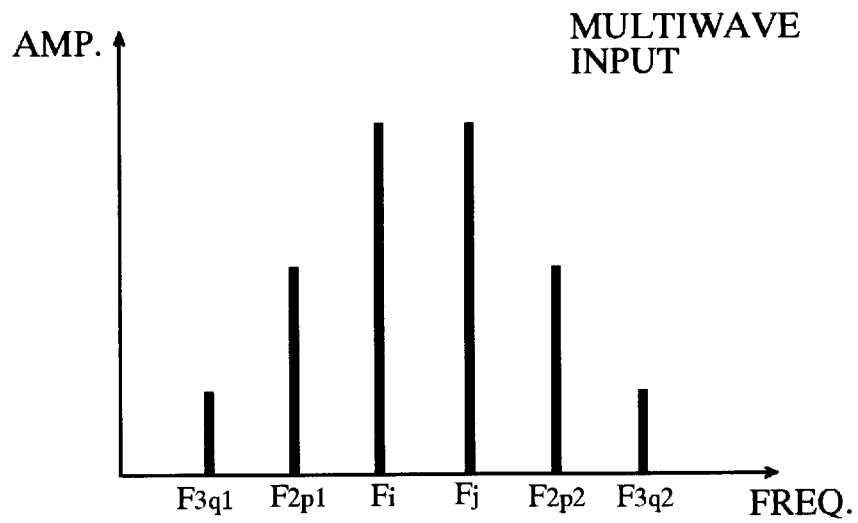
FIG. 5A is a spectrum diagram of an input signal of the embodiment as shown in FIG. 2.
Figure 5B:
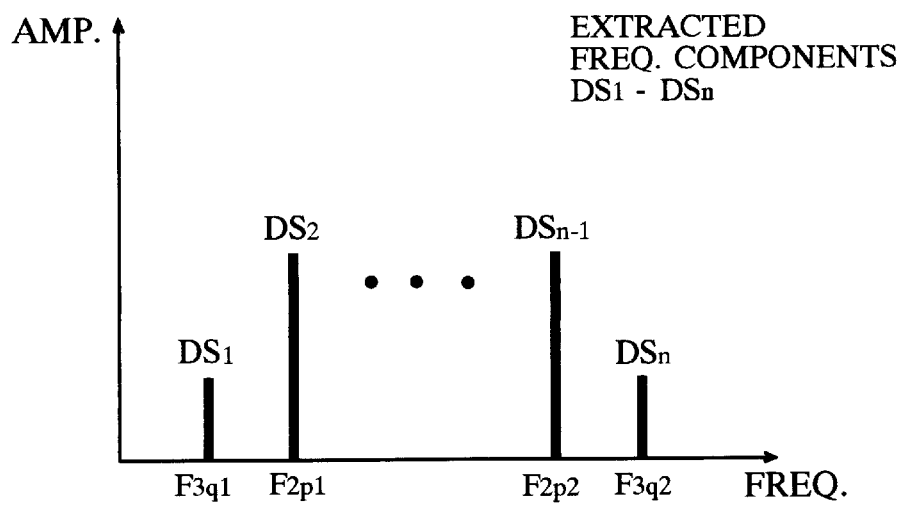
FIG. 5B is a spectrum diagram of extracted frequency components in the embodiment as shown in FIG. 2.

FIGS. 5A and 5B show the spectrum diagrams of the multiwave input signal and the distortion frequency components DS1–DSn extracted by the band-pass filter BPF1–BPFn, respectively. As shown in FIG. 5A, the input multiwave signal includes the major signals of major frequencies Fi and Fj as well as intermodulation distortion components of frequencies F2p1, F2p2, F3p1 and F3p2. Among these signal components, the intermodulation distortion components are extracted by the band-pass filter BPF1–BPFn as shown in FIG. 5B. Therefore, after reversing the phases of the frequency components DS1–Dsn and then amplifying the phase-reversed frequency components as shown in FIG. 5B, the intermodulation distortion components (FIG. 5B) are eliminated from the multiwave input signal (FIG. 5A) by the combiner 105 combining the phase-reversed distortion frequency components with the multiwave input signal.

INTERMODULATION AND HARMONIC DISTORTION ELIMINATION

Figure 4:
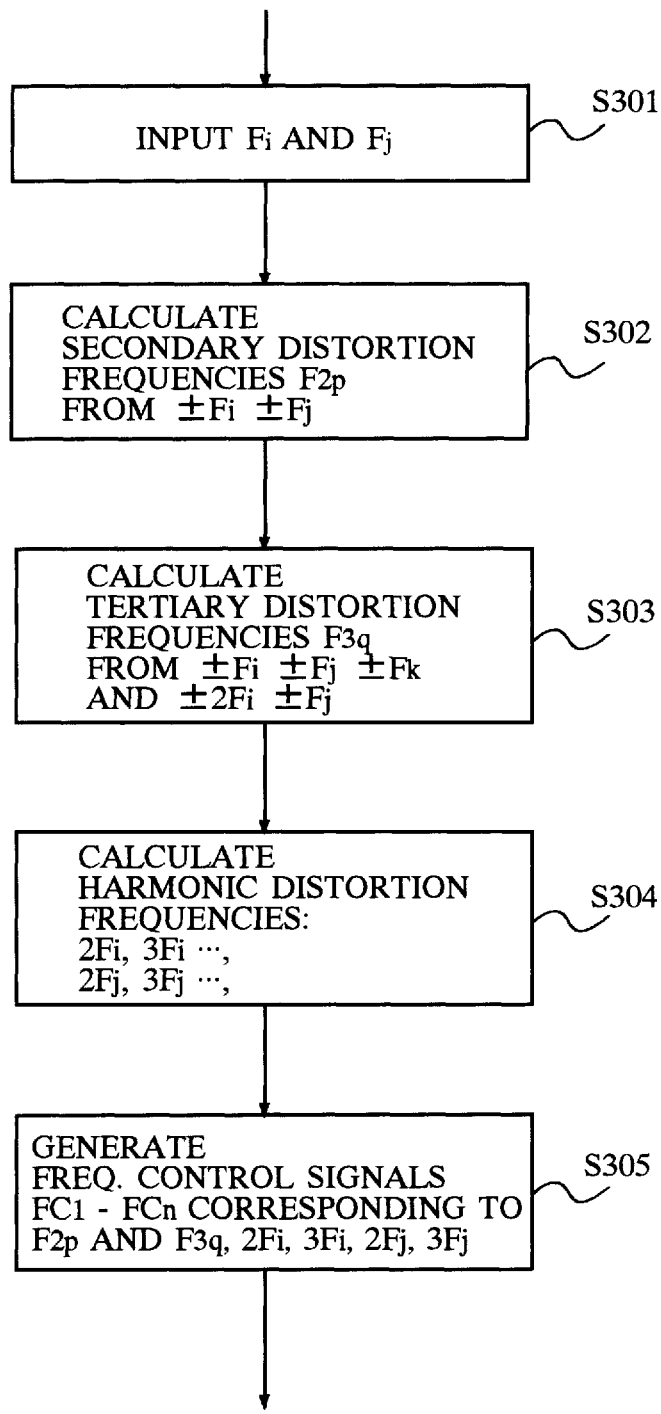
FIG. 4 is a flowchart showing another embodiment of a distortion compensating method according to the present invention.

FIG. 4 shows an operation of generating frequency control signals for the intermodulation and harmonic distortion elimination performed in the controller 106. When receiving the major frequencies Fi and Fj (S301), the controller 106 reads the formulae, ±Fi±Fj, for secondary intermodulation distortion, $\pm 2Fi \pm Fj$ for tertiary intermodulation distortion, 2Fx for secondary harmonic distortion, and 3Fx for tertiary harmonic distortion from the memory 108. Since the intermodulation distortion occurs at frequencies of positive results of $\pm Fi \pm Fj$ or $2Fi \pm Fj$, the computing circuit 107 readily calculates the intermodulation distortion frequencies. More specifically, the secondary distortion frequencies F2p are calculated from $\pm Fi \pm Fj$ (S302), and the tertiary distortion frequencies F3p from $\pm 2Fi \pm Fj$ (S303). Furthermore, the harmonic distortion frequencies 2Fi, 2Fj, 3Fi and 3Fj are calculated from 2Fx and 3Fx (S304). In cases where the major frequencies Fi, Fj and Fk are detected by the major frequency detector 101, the formulae, $\pm Fi \pm Fj \pm Fk$, is read out and used to calculate the tertiary intermodulation distortion frequencies F3p.

Receiving the distortion frequencies F2p, F3p, 2Fi, 2Fj, 3Fi and 3Fj from the computing circuit 107, the controller 106 generates the frequency control signals FC1–FCn indicating the respective distortion frequency bands (S305). The respective frequency control signals FC1–Fcn are output to the band-pass filters BPF1–BPFn which are set at the passband frequencies corresponding to the frequency control signals FC1–Fcn. This causes the filter circuit 109 to pass only the distortion frequency components DS1–Dsn of the input multiwave signal to the phase adjustment circuit 110. In this manner, the intermodulation and harmonic distortion is eliminated from the multiwave input signal by the combiner 105 combining the phase-reversed distortion frequency components with the multiwave input signal.

Figure 6:
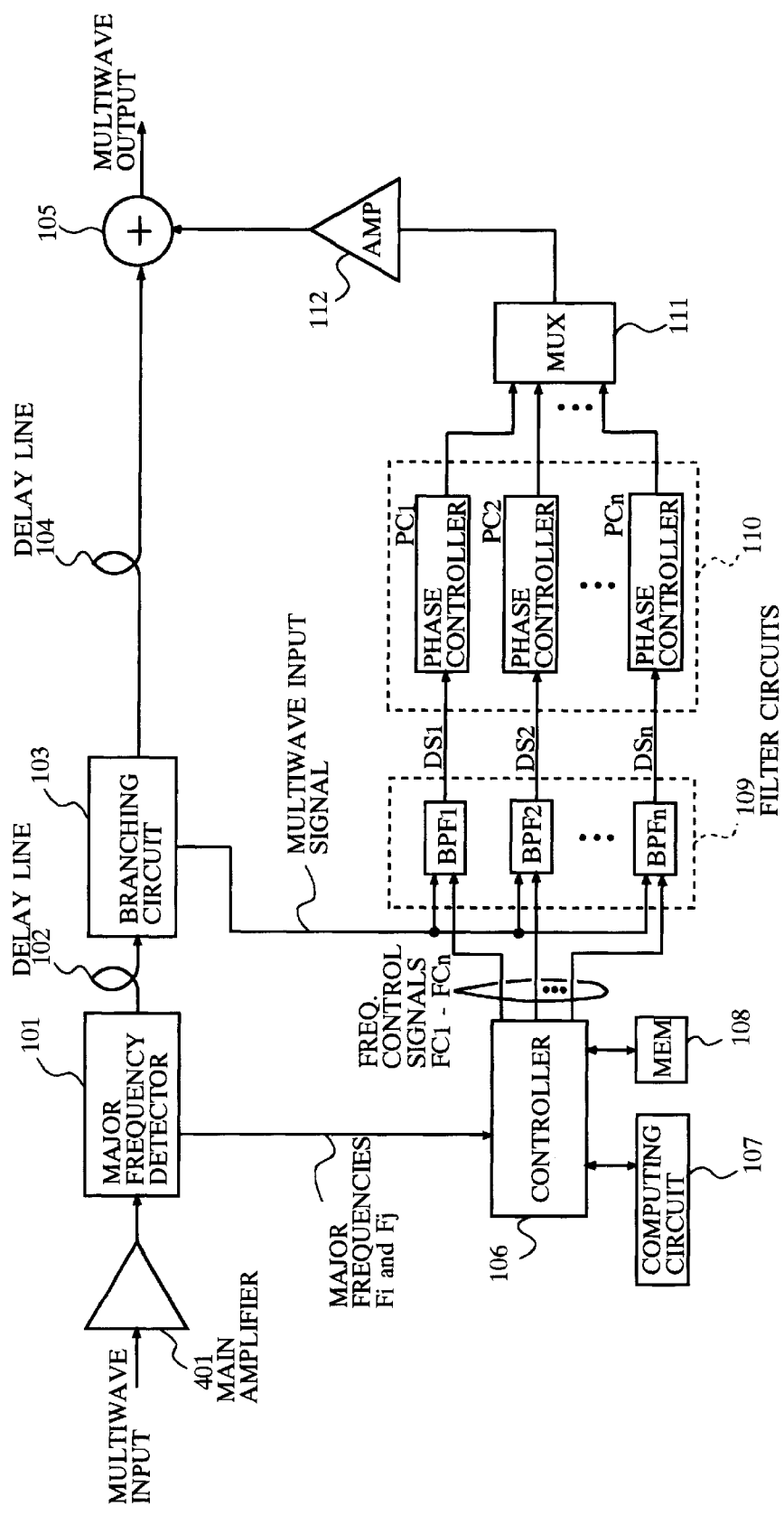
FIG. 6 is a block diagram showing the circuit configuration of a transmission signal amplifier employing the embodiment.

As described above, the distortion compensating circuit directly eliminates the distortion components from the input signal. Therefore, as shown in FIG. 6, a main amplifier (transmission power amplifier) 401 exhibiting a nonlinear characteristic may be provided as a preceding stage of the distortion compensating circuit.

It is apparent that a transmission line or a circuit exhibiting a nonlinear characteristic may be also provided as a preceding stage of the distortion compensating circuit. Further,

What is claimed is:

1. A circuit for compensating for non-linear distortion of an input signal, said input signal including a major signal having a predetermined frequency, said circuit comprising:
    a spectrum analyzer for analyzing said input signal and detecting said major signal and generating a detected major frequency signal representing said predetermined frequency;
    a distortion frequency calculator for calculating a distortion frequency signal based on said detected major frequency signal and a predetermined formula representing said nonlinear distortion;
    a branching circuit for branching said input signal into a first signal and a second signal;
    an extractor, responsive to said distortion frequency signal, for extracting a frequency component having said distortion frequency from said first signal received from said branching circuit; and
    an eliminator for eliminating a signal having said distortion frequency from said second signal based on said extracted frequency component.

2. The circuit according to claim 1, wherein said distortion frequency calculator comprises:
    a storage for storing said predetermined formula;
    a calculator for calculating said distortion frequency using said predetermined formula and said predetermined frequency; and
    a controller for controlling said storage and said calculator so as to generate an extraction control signal, said extraction control signal causing said extractor to pass said frequency component of said distortion frequency.

3. The circuit according to claim 1, wherein said extractor comprises a band-pass filter having a variable passband frequency which is set at said distortion frequency.

4. The circuit according to claim 2, wherein said extractor comprises a band-pass filter having a variable passband frequency determined by said extraction control signal.

5. The circuit according to claim 1, wherein said extractor comprises:
    an adjuster for adjusting a phase and an amplitude of said frequency component for generating an adjusted frequency component; and
    wherein said eliminator comprises a combiner for combining said adjusted frequency component with said second signal so as to cancel out said frequency component from said second signal.

6. The circuit according to claim 1, wherein said predetermined formula represents an intermodulation distortion.

7. The circuit according to claim 6, wherein said predetermined formula represents one of a secondary intermodulation distortion and a tertiary intermodulation distortion.

8. The circuit according to claim 1, wherein said predetermined formula represents a harmonic distortion.

9. The circuit according to claim 8, wherein said predetermined formula represents one of a secondary harmonic distortion and a tertiary harmonic distortion.

10. The circuit according to claim 1, wherein said predetermined formula represents one of an intermodulation distortion and a harmonic distortion.

11. A circuit for compensating for intermodulation distortion of an input signal, said input signal including a plurality of major signals, each having a corresponding predetermined frequency, said circuit comprising:
    a spectrum analyzer for analyzing said input signal and detecting said plurality of major signals and generating a detected major frequencies signal representing each of said predetermined frequencies;
    a distortion frequency calculator for calculating a plurality of distortion frequency signals based on said detected major frequencies signal and a plurality of predetermined formulae representing secondary and tertiary intermodulation distortion;
    a branching circuit for branching said input signal into a first signal and a second signal;
    an extractor, responsive to said distortion frequency signals, for extracting frequency components from said first signal received from said branching circuit, said frequency components having said distortion frequencies; and
    an eliminator for eliminating a signal having said distortion frequency from said second signal based on said extracted frequency components.

12. The circuit according to claim 11, wherein said distortion frequency calculator comprises:
    a storage for storing said predetermined formulae;
    a calculator for calculating said distortion frequencies using said predetermined formulae and said predetermined frequencies; and
    a controller for controlling said storage and said calculator so as to generate said second number of extraction control signals, said extraction control signals causing said extractor to pass said frequency components having said distortion frequencies, respectively.

13. The circuit according to claim 12, wherein said extractor comprises said second number of band-pass filters having variable passband frequencies determined by said extraction control signals, respectively.

14. A circuit for compensating for harmonic distortion of an input signal, said input signal including a plurality of major signals, each having a predetermined frequency, said circuit comprising:

a spectrum analyzer for analyzing said input signal and detecting said plurality of major signals and generating a detected major frequencies signal representing said predetermined frequencies;

a distortion frequency calculator for calculating a plurality of distortion frequency signals based on said detected major frequencies signal and at least one predetermined formula representing said harmonic distortion;

a branching circuit for branching said input signal into a first signal and a second signal;

an extractor, responsive to said distortion frequency signals, for extracting frequency components having from said first signal received from said branching circuit, said frequency components having said distortion frequencies; and an eliminator for eliminating a signal having said distortion frequency from said second signal based on said extracted frequency components.

15. The circuit according to claim 14, wherein said distortion frequency calculator comprises:

a storage for storing said at least one predetermined formula;

a calculator for calculating said distortion frequencies using said predetermined formula and said predetermined frequencies; and a controller for controlling said storage and said calculator so as to generate said second number of extraction control signals, said extraction control signals causing said extractor to pass said frequency components having said distortion frequencies, respectively.

16. The circuit according to claim 15, wherein said extractor comprises said second number of band-pass filters having variable passband frequencies determined by respective ones of said extraction control signals.

17. A transmission system comprising:

a power amplifier for amplifying a power of an input signal to generate an amplified input signal, said input signal including a plurality of major signals, each having a respective predetermined frequency;

a spectrum analyzer for analyzing said amplified input signal and detecting said plurality of major signals and generating a detected major frequencies signal representing said predetermined frequencies;

a distortion frequency calculator for calculating a plurality of distortion frequency signals based on said detected major frequencies signal and a plurality of predetermined formulae representing said nonlinear distortion;

a branching circuit for branching said amplified input signal into a first signal and a second signal;

an extractor, responsive to said distortion frequency signals, for extracting frequency components having from said first signal received from said branching circuit, said frequency components having said distortion frequencies, respectively; and an eliminator for eliminating a signal having said distortion frequency from said second signal based on said extracted frequency components.

18. A method for compensating for non-linear distortion of an input signal, said input signal including a major signal having a predetermined frequency, said method comprising steps of:

spectrum analyzing said input signal to detect said major signal and generating a detected major frequency signal representing said predetermined frequency;

calculating a distortion frequency relative to said predetermined frequency based on said detected major frequency signal and a predetermined formula representing said nonlinear distortion;

branching said input signal into a first signal and a second signal;

extracting a frequency component having said distortion frequency from said first signal in response to said detected major frequency signal; and eliminating a signal having said distortion frequency from said second signal based on said extracted frequency component.

19. The method according to claim 18, wherein said predetermined formula represents an intermodulation distortion.

20. The method according to claim 19, wherein said predetermined formula represents one of a secondary intermodulation distortion and a tertiary intermodulation distortion.

21. The method according to claim 18, wherein said predetermined formula represents a harmonic distortion.

22. The method according to claim 21, wherein said predetermined formula represents one of a secondary harmonic distortion and a tertiary harmonic distortion.

23. A method for compensating for intermodulation distortion of an input signal, said input signal including a plurality of major signals, each having a respective predetermined frequency, said method comprising steps of:

spectrum analyzing said input signal to detect said plurality of major signals and generating a detected major frequencies signal representing each of said predetermined frequencies;

calculating a plurality of distortion frequencies from said predetermined frequencies based on said detected major frequencies signal and a plurality of predetermined formulae representing secondary and tertiary intermodulation distortions;

branching said input signal into a first signal and a second signal;

extracting frequency components from said first signal in response to said calculated distortion frequencies, said frequency components having said distortion frequencies; and eliminating a signal having said distortion frequencies from said second signal based on said extracted frequency components.

24. A method for compensating for harmonic distortion of an input signal, said input signal including a plurality of major signals, each having a respective predetermined frequency, said method comprising steps of:

spectrum analyzing said input signal to detect said plurality of major signals and generating a detected major frequencies signal representing said predetermined frequencies;

calculating a plurality of distortion frequencies based on said detected major frequencies signal and at least one predetermined formula representing said harmonic distortion;

branching said input signal into a first signal and a second signal;

extracting frequency components having from said first signal in response to said calculated distortion frequencies, said frequency components having said distortion frequencies; and eliminating a signal having said distortion frequency from said second signal based on said extracted frequency components.

* * * * *